W. W. DENNIS.
ROLLER BEARING.
APPLICATION FILED NOV. 24, 1908.
958,957. Patented May 24, 1910.
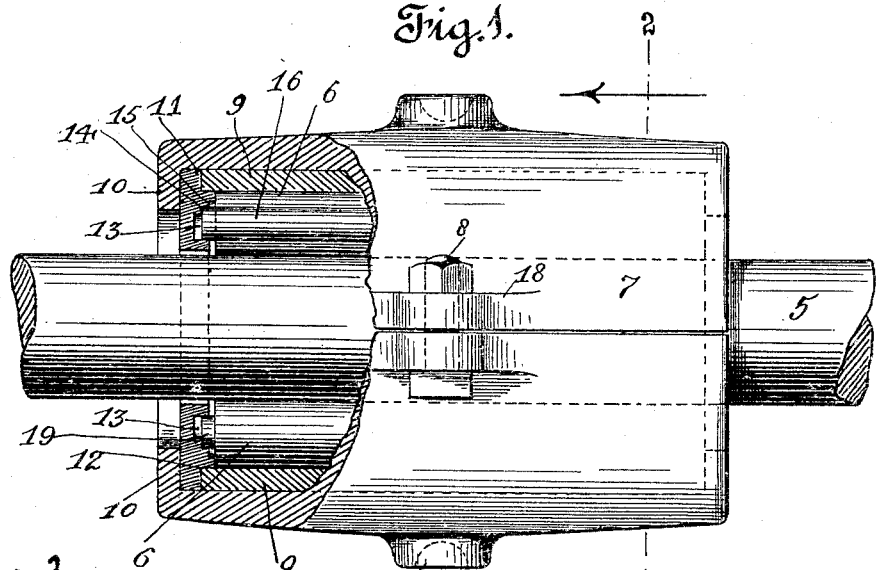
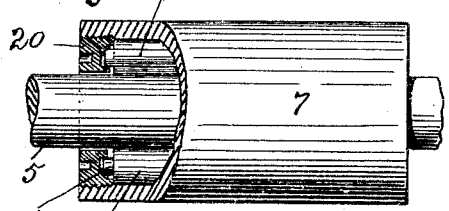
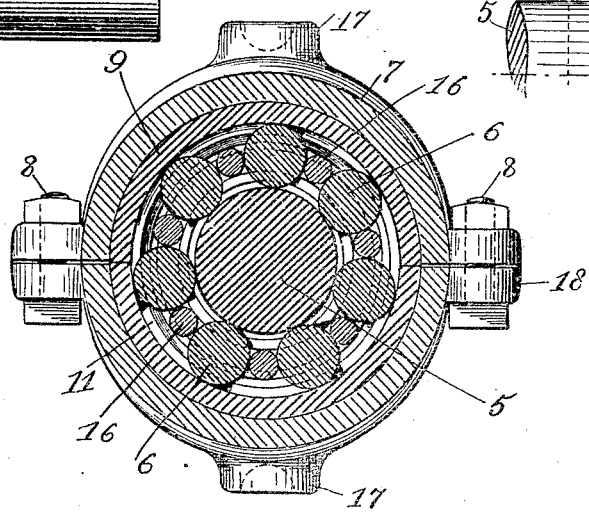
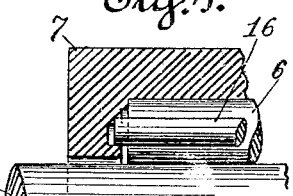
Witnesses,
Inventor,
Willard W. Dennis,
by
Attorney.

UNITED STATES PATENT OFFICE.

WILLARD W. DENNIS, OF LOS ANGELES, CALIFORNIA, ASSIGNOR OF ONE-HALF TO JOHN E. WARD, OF LOS ANGELES, CALIFORNIA.

ROLLER-BEARING.

958,957.  Specification of Letters Patent.  Patented May 24, 1910.

Application filed November 24, 1908. Serial No. 464,327.

*To all whom it may concern:*

Be it known that I, WILLARD W. DENNIS, a citizen of the United States, residing in the city of Los Angeles, county of Los Angeles, and State of California, have invented new and useful Improvements in Roller-Bearings, of which the following is a specification.

It is the object of my invention to provide a roller bearing of simple and cheap construction and of efficient operation, in which end thrust friction shall be reduced to the minimum.

Another object is to provide a roller bearing in which the bearing and spacing members are of the simplest form and cheapest construction.

Another object is to provide a roller bearing which may be readily placed around a shaft without slipping the same over the end of the shaft.

In the accompanying drawings illustrating my invention; Figure 1 is an elevation partly in section of a roller bearing on the fragment of a line shaft the supporting means of the bearing not being shown. Fig. 2 is a section on the line 2—2 of Fig. 1. Fig. 3 is a modification of the outer shell showing its adaptation to the hub of a buggy wheel. Fig. 4 is a fragment showing the end plate and shell integral.

In the drawings 5 is the line shaft which is supported by the bearing rollers 6. These bearing rollers are contained within the journal box 7 which for convenience in assembling is split longitudinally and the halves thereof are united by bolts 8. Where cheapness of construction is desired the journal box will be composed of an outer shell of cast metal and a lining 9 of tempered steel. The bearing rollers bear against this lining and against the shaft. The ends of the outer shell have an annular flange 10 projecting toward the shaft. Within this flange at the ends are annular end plates 11 which are provided in their opposing faces on the outer edges with rabbets 12 in which the ends of the lining are received as best shown in Fig. 1. Between the rabbet and the opening in the plate is a groove 13 whose outer edge surface is stepped as best shown in Fig. 1, thereby forming annular rabbets or tracks 14 and 15. Intermediate the bearing rollers are the spacing rollers 16 whose ends project within the groove formed in the end plates and being of a diameter to fit into the groove below rabbet 15 and to have the end thrust thereof borne by rabbet 14. The portion of the end plate immediately in contact with the inner surface of the end of the lining receives the end thrust of the bearing rollers as the inner portion of the body forming the groove is slightly cut away to prevent the end of the bearing roller contacting therewith. The bearing rollers could be provided with trunnions 19 which fit into that portion of the groove which receives the ends of the spacing rollers but are a little smaller than the spacing rollers.

Hanger lugs 17 are provided for the construction of the usual hangers for supporting a long line of shafting. Where the bearing is designed for use in such structures as wagon wheels, the hanger lugs 17 and connecting lugs 18 would be omitted and the outer shell would be constructed so that it could be driven into the hub of a wagon wheel. In this construction the outer shell and lining are preferably integral and the end plate 20 is exteriorly threaded and screws into the shell as shown in Fig. 3.

In Fig. 4 I have shown the end plate lining and outer shell integral, which is the preferred construction where cheapness of construction is not a consideration.

By this construction it will be observed that the end thrust both of the bearing rollers and spacing rollers is sustained by narrow tracks on the outer side of the bearing thereby reducing the friction to the minimum. It will also be observed that the bearing and spacing rollers are of the simplest construction consisting of simple plain cylinders.

Having described my invention what I claim is:

1. A roller bearing comprising an outer shell split longitudinally, said shell having inwardly projecting flanges, said flanges having annular grooves in their opposing faces, the outer surface of said grooves being rabbeted to form tracks; spacing rollers consisting of cylindrical bodies having the ends thereof projecting into said grooves and the end of the outer edge bearing against the inner rabbet or track; bearing rollers intermediate the spacing rollers, said bearing rollers having trunnions.

2. A roller bearing adapted for placement around a shaft comprising a series of load sustaining rollers and spacing rollers alternately arranged, the said spacing rollers being of less diameter and longer than the sustaining rollers; a member encompassing said rollers having annular internal flanges at the ends thereof, said flanges having annular grooves in their opposing surfaces, the outer portion of said grooves being stepped and so arranged that one of the steps bears against the ends of the spacing rollers to receive the end thrust thereof only at the outer edge of said rollers.

In witness that I claim the foregoing I have hereunto subscribed my name this 27th day of October, 1908.

WILLARD W. DENNIS.

Witnesses:
   G. E. HARPHAM,
   S. B. AUSTIN.